United States Patent
Andina Silva et al.

(10) Patent No.: US 11,568,344 B2
(45) Date of Patent: Jan. 31, 2023

(54) SYSTEMS AND METHODS FOR AUTOMATED PATTERN DETECTION IN SERVICE TICKETS

(71) Applicant: JPMORGAN CHASE BANK, N.A., New York, NY (US)

(72) Inventors: Miguel Andina Silva, Buenos Aires (AR); Alejandro David Lago, Buenos Aires (AR); Agustin Vidal Guitar, Buenos Aires (AR); Carl Bartlett, Ferndown (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/375,972

(22) Filed: Jul. 14, 2021

(65) Prior Publication Data

US 2022/0019954 A1 Jan. 20, 2022

Related U.S. Application Data

(60) Provisional application No. 63/052,755, filed on Jul. 16, 2020.

(51) Int. Cl.
| | |
|---|---|
| *H04L 12/00* | (2006.01) |
| *G06Q 10/06* | (2012.01) |
| *G06N 20/00* | (2019.01) |
| *G06F 16/33* | (2019.01) |
| *G06F 11/07* | (2006.01) |
| *H04L 41/5074* | (2022.01) |

(52) U.S. Cl.
CPC ... *G06Q 10/06316* (2013.01); *G06F 11/0754* (2013.01); *G06F 11/0766* (2013.01); *G06F 16/334* (2019.01); *G06N 20/00* (2019.01); *H04L 41/5074* (2013.01)

(58) Field of Classification Search
CPC .. G06Q 10/06; G06Q 10/06316; G06F 16/33; G06F 11/0754; G06F 11/0766; G06F 16/334; G06N 20/00; G06N 7/005; H04L 41/5074
USPC .................. 709/223, 201, 217; 707/769, 770
See application file for complete search history.

(56) References Cited

U.S. PATENT DOCUMENTS

| | | | |
|---|---|---|---|
| 10,075,442 B2 * | 9/2018 | Simpson | ............... G06F 16/144 |
| 10,771,349 B2 * | 9/2020 | Maes | ...................... H04L 41/18 |
| 2022/0044254 A1 * | 2/2022 | Dixit | .................... G06Q 30/016 |

* cited by examiner

*Primary Examiner* — Frantz Coby
(74) *Attorney, Agent, or Firm* — Greenberg Traurig LLP (57) ABSTRACT

Systems and methods pattern detection in service tickets are disclosed. According to one embodiment, an analytics computer application may: (1) determine a service ticket threshold for an Information Technology (IT) resource; (2) receive a plurality of service tickets for the IT resource; (3) pre-process text of the plurality of service tickets; (4) identify keyword patterns in the pre-processed text of the plurality of service tickets; (5) group the plurality of service tickets into subsets of service tickets based on the keyword patterns; (6) determine that a number of service tickets in one of the subsets of service tickets exceeds the service ticket threshold; (7) identify an IT component associated with the subset of service tickets; (8) identify users affected by the IT component; and (9) notify the users affected by the IT component of an issue with the IT component.

20 Claims, 3 Drawing Sheets

SYSTEMS AND METHODS FOR AUTOMATED PATTERN DETECTION IN SERVICE TICKETS

RELATED APPLICATIONS

This application claims priority to, and the benefit of, U.S. Provisional Patent Application Ser. No. 63/052,755, filed Jul. 16, 2020, the disclosure of which is hereby incorporated, by reference, in its entirety.

BACKGROUND OF THE INVENTION

1. Field of the Invention

Embodiments relate generally to systems and methods for automated pattern detection in service tickets.

2. Description of the Related Art

Users within an organization often submit service tickets when experiencing technical issues with Information Technology (IT) services. These service tickets may be handled by IT Support Technicians to resolve the issues described in the service tickets. Without hiring additional IT Support Technicians, it may be hard to address an increasing number of incoming service tickets.

SUMMARY OF THE INVENTION

The present disclosure relates to using statistical process control, natural language processing, artificial intelligence, and/or machine learning to service tickets to identify patterns in large sets of service tickets for early detection of IT-related issues. Service tickets in a queue may be analyzed in batches to determine the presence of systemic issues of an IT resource. Embodiments are directed to determining the IT resources implicated in a subset of service tickets that are similarly clustered. For example, a user identifier associated with a service ticket may map to specific servers, databases, or locations. The IT resources used by each user may be tracked and used to correlate the subset of service tickets to an IT resource. Upon determining a subset of similarly clustered service tickets. A report may be generated periodically indicating the services that are implicated, the IT resources that are implicated, and the identities of each service ticket within the cluster. In addition, a master service ticket may be generated, where the master service ticket links each of the service tickets in the subset. In this respect, a Queue Manager may address all service tickets within the subset by resolving the master service ticket.

Systems and methods pattern detection in service tickets are disclosed. According to one embodiment, a method for pattern detection in service tickets may include: (1) determining, by an analytics computer application, a service ticket threshold for an Information Technology (IT) resource; (2) receiving, by the analytics computer application, a plurality of service tickets for the IT resource; (3) pre-processing, by the analytics computer application, text of the plurality of service tickets; (4) identifying, by the analytics computer application, keyword patterns in the pre-processed text of the plurality of service tickets; (5) grouping, by the analytics computer application, the plurality of service tickets into subsets of service tickets based on the keyword patterns; (6) determining, by the analytics computer application, that a number of service tickets in one of the subsets of service tickets exceeds the service ticket threshold; (7) identifying, by the analytics computer application, an IT component associated with the subset of service tickets; (8) identifying, by the analytics computer application, users affected by the IT component; and (9) notifying, by the analytics computer application, the users affected by the IT component of an issue with the IT component.

In one embodiment, the IT resource may be a hardware resource or a software resource.

In one embodiment, the service ticket threshold may be based on a history of service tickets received for a time period.

In one embodiment, the service ticket threshold may be determined periodically.

In one embodiment, the plurality of service tickets may be received as a batch.

In one embodiment, the analytics computer application may identify the keyword patterns in the pre-processed text of the plurality of service tickets by searching for specific words related and a number of incidents of the specific words using an encoded query.

In one embodiment, the method may further include determining, by the analytics computer application, a status of the IT component. The status may include a Central Processing Unit (CPU) usage and/or a memory load.

In one embodiment, the method may further include generating, by the analytics computer application, a report identifying the IT component and a listing of the service tickets in the subset of service tickets.

In one embodiment, the method may further include generating, by the analytics computer application, a master service ticket for the subset of service tickets.

According to another embodiment, an electronic device may include a memory storing an analytics computer application and a computer processor. When executed by the computer processor, the analytics computer application may cause the computer processor to: determine a service ticket threshold for an Information Technology (IT) resource; receive a plurality of service tickets for the IT resource; pre-process text of the plurality of service tickets; identify keyword patterns in the pre-processed text of the plurality of service tickets; group the plurality of service tickets into subsets of service tickets based on the keyword patterns; determine that a number of service tickets in one of the subsets of service tickets exceeds the service ticket threshold; identify an IT component associated with the subset of service tickets; identify users affected by the IT component; and notify the users affected by the IT component of an issue with the IT component.

In one embodiment, the IT resource may be a hardware resource or a software resource.

In one embodiment, the service ticket threshold may be based on a history of service tickets received for a time period.

In one embodiment, the service ticket threshold may be determined periodically.

In one embodiment, the plurality of service tickets are received as a batch.

In one embodiment, the analytics computer application may identify the keyword patterns in the pre-processed text of the plurality of service tickets by searching for specific words related and a number of incidents of the specific words using an encoded query.

In one embodiment, the analytics computer application may further cause the computer processor to determine a status of the IT component. The status may include a Central Processing Unit (CPU) usage and/or a memory load.

In one embodiment, the analytics computer application may further cause the computer processor to generate a report identifying the IT component and a listing of the service tickets in the subset.

In one embodiment, the analytics computer application may further cause the computer processor to generate a master service ticket for the subset of service tickets.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for automated pattern detection in service tickets.

Figure 1:
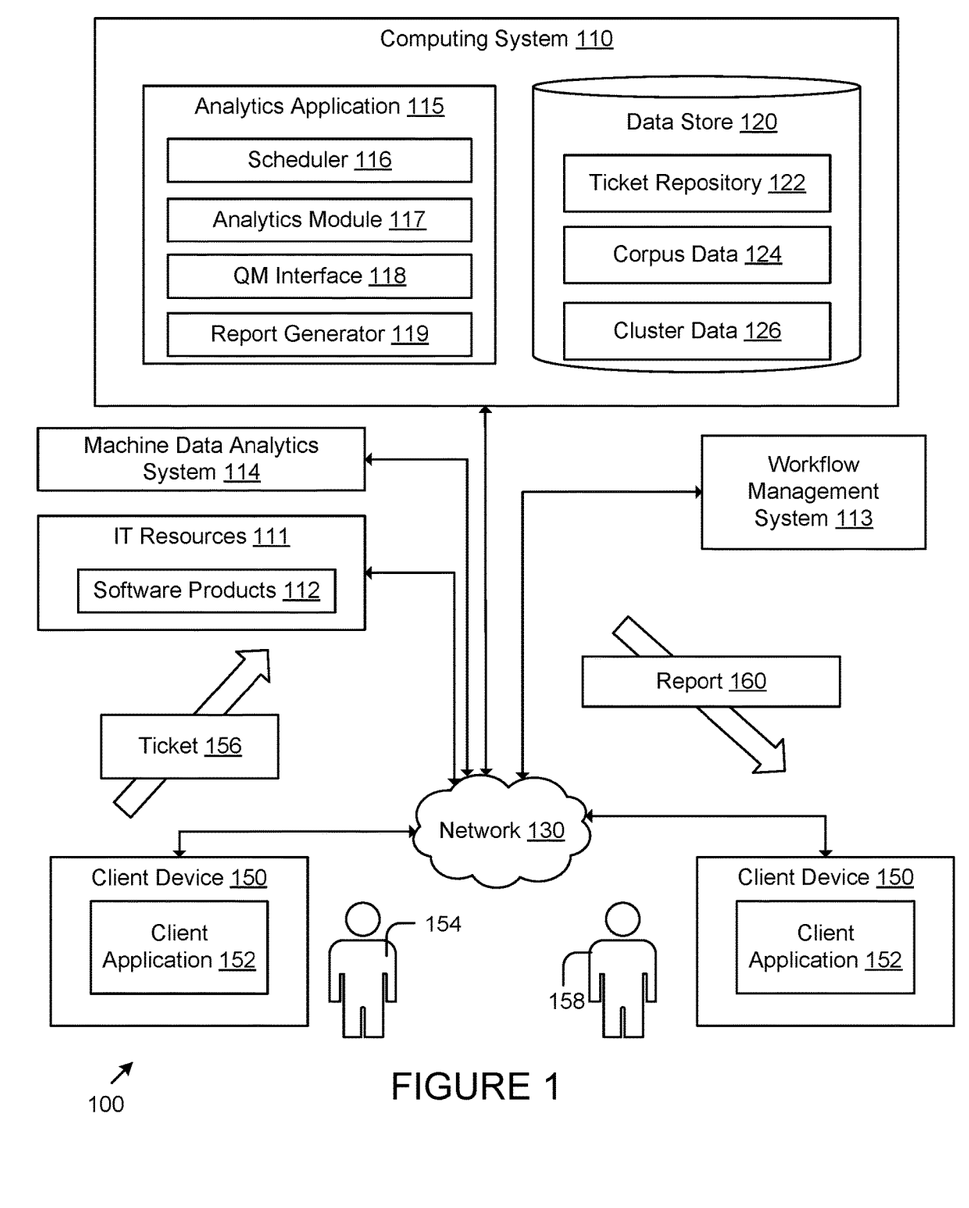
FIG. 1 is a depicts a system for pattern detection in service tickets according to an embodiment.

FIG. 1 depicts a networked environment 100 according to various embodiments. The networked environment 100 includes a computing system 110 that may execute application programs and store various data. The computing system 110 may be implemented as a server installation or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource, and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110 to execute server-side applications. Embodiments of the present disclosure may be implemented within the computing system 110, as described in greater detail below.

The networked environment 100 may include Information Technology (IT) resources 111. IT resources 111 include hardware systems such as servers, databases, or other hardware/software systems used by an organization. IT resources may be organized according to location. For example, one server/database may support a first geographic location while a second server/database may support a second geographic location. IT resources 111 implement different software products 112. Software products 112 may include software tools, IT software solutions, applications, or other software products/features that are used by an organization. Software products 112 include internally built software solutions as well as third-party solutions. In some embodiments, the software products 112 include Software as a Service (SaaS) solutions offered by third parties or built internally. Software products 112 may be executed in a distributed environment and provided to end users. Each software product 112 may be provided one or more IT resources 111. Users who use software products 112 ultimately access the underlying IT resources 111.

The networked environment 100 may also include a workflow management system 113. The workflow management system 113 may be a SaaS-based system or Platform-as-a-service (PaaS) based system that provides technical management support to the IT operations of large corporations. The workflow management system 113 may include a help desk functionality. The workflow management system 113 may provide an interface to allow users to create and submit service tickets to report incidences relating to use of the software products 112.

The networked environment 100 may also include a machine data analytics system 114. The machine data analytics system 114 may be a SaaS-based system or PaaS based system that records data logs for each user session involving the IT resources 111. For example, each time a user uses a software product 112, the IT resource (e.g., server, database, etc.) that supports the software product 112 is identified, and a corresponding data log is generated. The data log may include time stamps of the usage of the IT resource, an identification of the IT resource, the user identity of the user using the IT resource, or other information about the usage session. The data log may be structured or semi-structured. Data logs may be generated in real time as usage of the IT resources continue.

In addition to hosting or storing the data logs, the machine data analytics system 114 may execute software routines to structure the data logs and provide an interface for querying the data logs. In this respect, data logs may be searched for using search queries or Application Programming Interfaces (APIs). A search query may have input parameters such as, for example, the user identifier, and timestamp range. In response to a search query, the machine data analytics system 114 may identify the IT resources used by the user of the corresponding user identifier for a specified range of time.

The computing system 110 may include an analytics application 115. Various embodiments may be implemented as functionality within the analytics application 115. The analytics application 115 may be implemented as a script, source code, or other executable object.

At a high-level, the analytics application 115 analyzes a batch of service tickets received within a window of time. The analytics application 115 identifies patterns in the data contained in the service tickets to determine if there is a systematic incident related to an IT resource 111 or software product 112. For example, the analytics application 115 determines the frequency of a particular keyword pattern (e.g., a single keyword or a combination of key words) appears in the batch of service tickets. The service tickets containing the keyword pattern are clustered together as a subset of service tickets. In addition, a master service ticket may be generated to represent the subset of service tickets.

The analytics application 115 may include several modules. For example, the analytics application 115 may include a scheduler 116, an analytics module 117, a Queue Manager (QM) interface 118, and a report generator 119.

The scheduler 116 obtains a set of service tickets from a queue according to a schedule. For example, the scheduler may obtain all service tickets in the queue that were received in each 15-minute interval. There may be thousands of service tickets obtained by the scheduler 116. The scheduler may use an API or function call to interface with the workflow management system 113 to extract service tickets falling within an interval of time defined by the schedule.

Service tickets may contain unstructured text used to determine the presence of keyword patterns. The unstructured text may be extracted from each service ticket and pre-processed before it is analyzed. Pre-processing may include removing stop words, applying a Lemmatization function, or removing predefined text. This may streamline the analytics process so that more relevant words are analyzed.

The analytics module 117 may include a natural language processor that identifies one or more topics after the unstructured text is pre-processed. The analytics application 115 may be configured to analyze unstructured text with respect to a set of topics. A topic may refer to an issue or problem with respect to a software product.

In some embodiments, the natural language processing involves generating a term dictionary for the batch of service tickets. A term dictionary may include an indexing of each unique term within the batch of service tickets. The term dictionary may be converted into a document term matrix. A document term matrix may be formatted as a table that represents the frequency that each term appears in a document. The document-term matrix may specify the frequency of each term in the term dictionary for each case record within the batch of service tickets. In other embodiments, the natural language processing involves searching for keyword patterns within the batch of service tickets.

If a keyword pattern appears within the batch of service tickets at a frequency that exceeds a threshold amount, an alert may be generated. The threshold may be set to be a predefined number of standard deviations above an expected value.

In some embodiments, the analytics module 117 searches for predefined keyword patterns (e.g., hardcoded words or phrases). When the frequency of the predefined keyword pattern exceeds a threshold, an alert is generated. In some embodiments, different thresholds are applied to different predefined keyword patterns.

Some embodiments are directed to generating a Latent Dirichlet Allocation (LDA) model. A LDA model is a generative approach to identifying texts that are similar.

Some embodiments involve using artificial intelligence to identify keyword patterns. For example, the analytics module 117 may apply unsupervised machine learning to cluster service tickets in the batch. Clustering algorithms include, for example, K-Means, Mean-Shift, density-based spatial clustering applications with noise (DBSCAN), or Fuzzy C-Means. The clustering algorithm may convert each service ticket into a feature vector and then cluster the feature vectors. The emergence of large-sized clusters may indicate the presence of a pattern in the batch of service tickets.

The QM interface 118 provides a portal to allow Queue Managers to access individual service tickets, resolve service tickets, or update service tickets. In some embodiments, the QM interface 118 may be implemented by the workflow management system 113.

The report generator 119 may generate a report for a particular batch of service tickets that are analyzed. The report may be an email that is automatically generated and transmitted to a predefined set of recipients. The report may be a push notification or any other electronic communication. The report may include the results of the analytics performed on the batch of service tickets or may include a link to the results. The results of the analytics may include a summary of the software products 112 implicated by the batch of service tickets, a summary of the IT resources implicated by the batch of service tickets, a reference to each service ticket in the batch, a reference to each service ticket in a subset of the service tickets that have been clustered together, an identification of the subset of service tickets that have been clustered together, and/or a master service ticket that represents the subset of service tickets that have been clustered together.

The computing system 110 may include a data store 120. The data store 120 may store data, files, executable code, libraries, application programming interfaces (APIs), and other data/executables to allow the application programs of the computing system 110 to execute. For example, the application programs of the computing system 110 may read data from the data store, write data to the data store 120, update, delete, or otherwise manipulate data in the data store 120.

The data store 120 may store service tickets in a service ticket repository 122, corpus data 124, and cluster data 126. A service ticket may include unstructured text, a user identifier of the sender of the service ticket, and metadata (e.g., a time stamp) associated with the service ticket. Service tickets may be extracted from the workflow management system 113 and stored in the service ticket repository 122.

The corpus data 124 may include keyword patterns appearing in the batch of service tickets, as a whole. This may include a document term matrix.

The cluster data 126 may include data structures that link together subsets of service tickets. Clusters are identified when service tickets contain similar keyword patterns. For example, all service tickets that include the keywords "validation" and "login" may be clustered together to form a subset of service tickets. The cluster data 126 may include a cluster identifier for all service tickets in this subset.

The computing system 110, the IT resources 111, the workflow management system 113, and machine data analytics system 114 may each be coupled to a network 130. The network 130 may include networks such as the Internet, intranets, extranets, wide area networks (WANs), local area networks (LANs), wired networks, wireless networks, or other suitable networks, etc., or any combination of two or more such networks. The computing system 110 may communicate with a plurality of client devices 150 over the network. In this respect, the computing system 110 and client devices 150 may be arranged in a client-server configuration.

The client device 150 may be a personal computing device, laptop, mobile device, smart phone, tablet, desktop, or other device. The client device 150 may include a client application 152 such as a browser or dedicated mobile application to communicate with the computing system 110. The computing system 110 may receive requests from the client device 150 and generate responses using a communication protocol such as, for example, Hyper Text Transport Protocol (HTTP).

Some client devices 150 may be operated by a first set of users 154 who use the software products 112 of the computing system 110. The first set of users 154 may be employees, clients, or customers of an organization who are the end-users of the software products 112. The first set of users 154 may submit service tickets 156 when encountering an issue with a particular software product 112. Each service ticket 156 that is transmitted by the client device 150 to the computing system 110 over the network 130 may be stored in a service ticket repository 122. The client devices 150 may interface with the workflow management system 113 to generate and submit the service ticket 156.

Some client devices 150 may be operated by a second set of users 158 who use the analytics application 115. The second set of users 158 may be queue managers who handle and close service tickets 156 until they reach a point of resolution. Client devices 150 may receive reports 160 that include the results of the analytics application 115.

Figure 2:
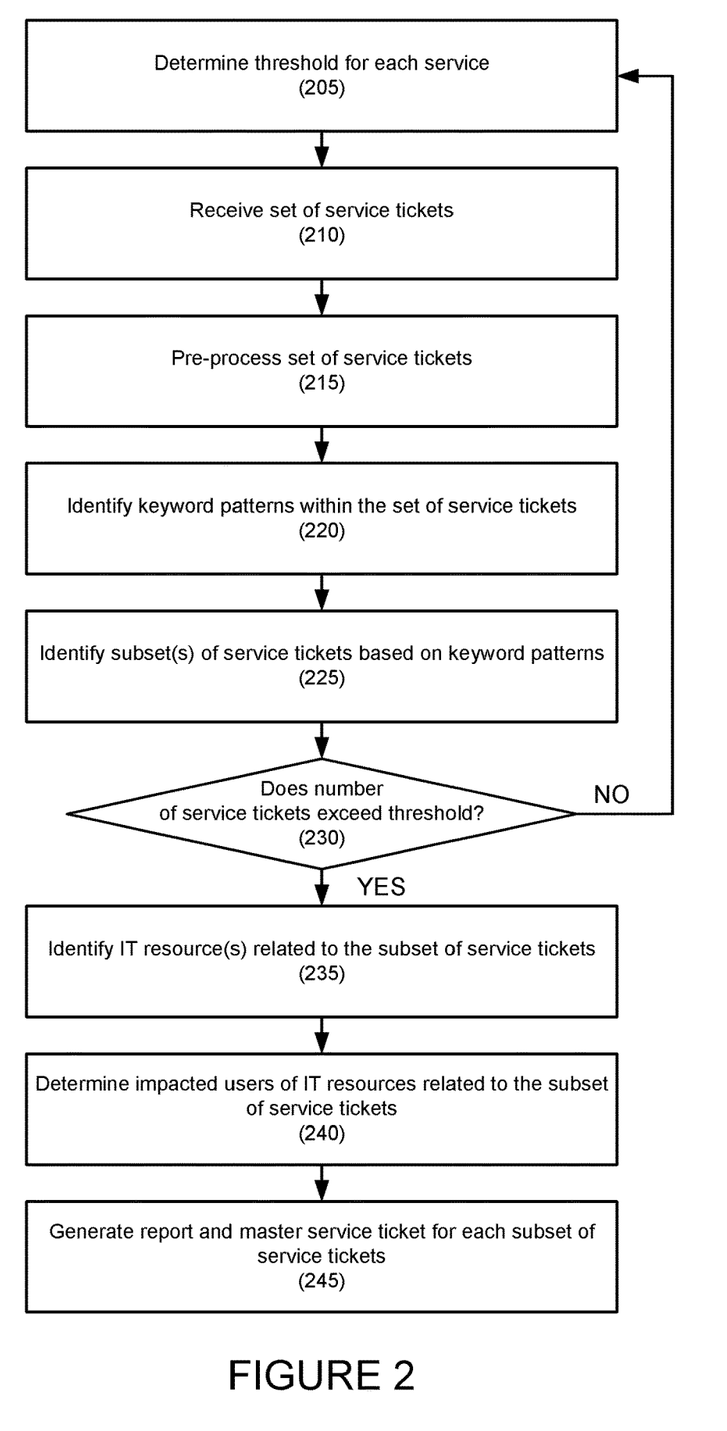
FIG. 2 depicts a method for pattern detection in service tickets according to an embodiment.

FIG. 2 is a flowchart illustrating an example of the functionality of an analytics application according to various embodiments. It is understood that the flowchart of FIG. 2 provides an illustrative example of the many different types of functional arrangements that may be employed to implement the operation of the portion of a computing system as described herein. The flowchart of FIG. 2 may also be viewed as depicting an example of a method implemented in the networked environment 100 of FIG. 1 according to one or more embodiments. FIG. 2 may represent the functionality of an analytics application, such as, for example, the analytics application 115 of FIG. 1.

In step 205, the computing system may determine a threshold for each IT resource (e.g., hardware and/or software). In one embodiment, the computing system may retrieve data for a prior period of time to determine an expected number of service tickets for the IT resource for a current period of time. For example, the computing system may retrieve the number of service tickets for the IT resource for the past 15 weeks within a time window (e.g., Mondays between 9:00 am and 9:15 am), and may determine the threshold for the IT resource for the current time (e.g., Monday at 9:00 am). In embodiments, the threshold may be based on the average and may remove outliers using the standard deviation and the three-sigma deviation.

In another embodiment, the threshold may be based on the average number of service tickets received, the median number of service tickets received, the mode of the number of service tickets received, etc.

In one embodiment, the thresholds may be set up on an hourly basis or any other basis as is necessary and/or desired.

In step 210, the computing system may receive a set of service tickets according to a schedule. The set may be referred to as a batch such that the service tickets are processed in a batch. The schedule may be periodic. The service tickets may be generated on IT service management platform. The schedule may be defined by a script that executes according to a predefined period of time (e.g., once every 15 minutes).

In one embodiment, the service tickets may be tagged with the IT resource affected, the user(s) affected, the position of the user(s) affected, etc.

In step 215, the computing system may pre-process the set of service tickets. For example, a text pre-processing process may remove specific text from the unstructured text contained in each service ticket. The pre-process may use one or more regular expressions containing predefined text. Predefined text may include specific words or phrases such as the name of the organization or generalist phrases that do not meaningfully provide context. The pre-process may remove common words that do not provide significant context (e.g., "stop words") such as the words "a", "the", "in", "an", etc.

The pre-processor may apply a Lemmatization function to the case text to convert each word into a predefined root word or stein of each word. For example, the word "having" may be converted to the stein word "have."

In step 220, the computing system may identify keyword patterns within the set of service tickets. For example, a script may perform an encoded query which searches for specific words related and the number of incidents for those words. The computing system may generate a document term matrix or term dictionary of the pre-processed text to determine keywords that appear in the set of service tickets. The computing system may use machine learning or natural language processing to identify patterns of text within the set of service tickets.

In step 225, the computing system may identify a subset(s) of service tickets based on keyword patterns. For example, if the computing system determines that a keyword pattern is present in the set of service tickets, the computing system may cluster together the individual service tickets that include the keyword pattern. For example, if the computing system determines that the keyword pattern "client portal" exceeds a threshold frequency for the set of service tickets, the computing system may cluster together the service tickets containing this keyword pattern. Different thresholds may apply for different keyword patterns. As another example, if the word "email" is typically found in the unstructured text of service tickets, then a higher threshold frequency may be applied to detect systemic issues pertaining to email. The computing system may detect a number of incidents surpasses a specific threshold. In embodiments, a machine learning algorithm may apply a threshold periodically for each combination of words using a Statistical Process Control or Natural Language Processing.

In step 230, the computing system may determine whether the number of service tickets exceeds the threshold determined in step 205. If it does not, the process may return to step 205 and the threshold for the next time period may be calculated.

If the number of service tickets exceeds the threshold, in step 235, the computing system may identity one or more IT resources related to the subset of service tickets. In one embodiment, the computing system may analyze each service ticket in the subset to identify the user identifier for the user that submitted the service ticket. Using the user identifier, the computer system may query a machine data analytics system to determine a list of IT resources used by the user associated with the user identifier for a particular period of time.

Once the IT resources are identified, the computing system may determine whether there is a IT resource that is common to, or substantially common to, the users that submitted the subset of service tickets. For example, if 75% of the service tickets were submitted by users that used a first database, then the first database may be identified as a common IT resource.

In embodiments, the computing system may identify one or more IT components (e.g., Datacenters, Databases, mailbox servers, etc.) shared by all the users associated with a cluster of service tickets.

In embodiments, the computing system may determine a status of the identified IT component(s). The status may include a CPU usage, a memory load, or other statuses associated with the identified IT component(s). In some embodiments, newly created service tickets may be added to the cluster of service tickets in response to applying NLP operations on the new service tickets as described above.

In addition, or instead, the computing system may also determine a software product related to the subset of service tickets. The computing system may analyze each service ticket in the subset to identify whether each service ticket references a common software product or substantially software product. The software product may be identified in the service ticket as metadata or as unstructured text in the service ticket.

In step 240, the computing system identify the impacted users of the IT resources related to the subset of service tickets. In one embodiment, once the IT resources are identified, the computing system may identity all, or substantially all, users associated with those IT resources.

In one embodiment, the computing system may generate an automated report to the impacted users to inform the users that a problem has been identified and being worked on.

In step 245, the computing system may generate a report. The report may be emailed, pushed, or otherwise transmitted to a plurality of predefined recipients. The report may identify the software product (as discussed in step 235), the IT resource (as discussed in 230), and/or the list of service tickets within the subset that were clustered together.

In embodiments, the computing system may also generate a master service ticket that represents the subset of service tickets that were clustered together based on sharing a keyword pattern. The master service ticket may be handled by a queue manager. Actions and operations taken on the master service ticket are automatically applied to each of the service tickets in the subset. In this respect, when a queue manager resolves the issue of the master service ticket and closes the master service ticket, each of the service tickets in the subset will close automatically. The master service ticket represents a major incident that may be validated or promoted to a corresponding support group. A public banner may be posted on appropriate communication channels. Child service tickets relating to the same incident as the master service ticket but that are created after the master service ticket may be automatically attached to the master service ticket. In some embodiments, a notification may be generated to each user who submitted a child service ticket attached to the master service ticket. The notification may identify the incident and information related to the incident. As the major service ticket is updated by a resolving team, the affected users may be automatically notified of the progress of the resolution. When the major service ticket is resolved, all associated child incidents may be automatically closed. In addition, each end user who submitted the child service ticket may be notified of the resolution.

Figure 3:
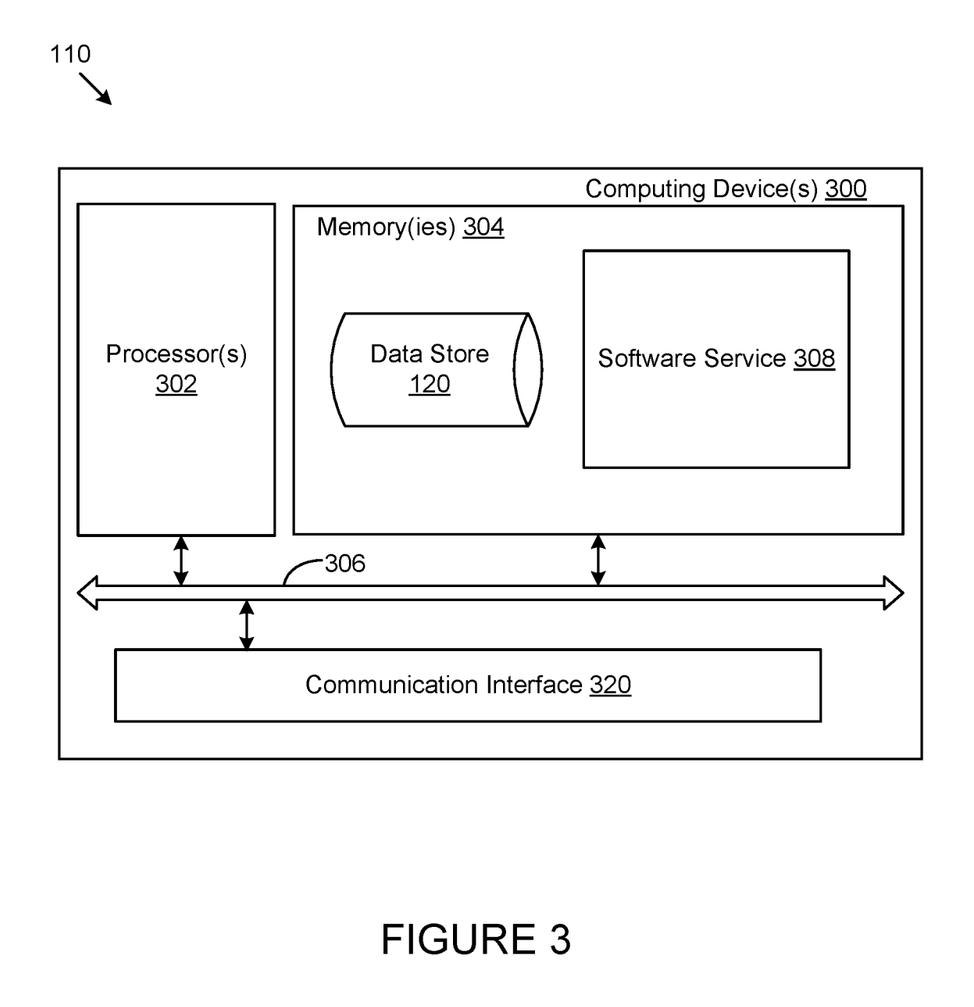
FIG. 3 depicts an example of an implementation of various embodiments in a computing system.

FIG. 3 is a schematic showing an example of an implementation of various embodiments in a computing system 110. The computing system 110 may include one or more computing devices 300 with distributed hardware and software to implement the functionality of the computing system 110.

The computing device 300 includes at least one processor circuit, for example, having a processor 302 and memory 304, both of which are coupled to a local interface 306 or bus. Stored in the memory 304 are both data and several components that are executable by the processor 302. For example, the memory 304 may include the data store 120 as well as other memory components that store data or executables.

Also stored in the memory 304 and executable by the processor 302 is a software service 308. The software application may implement the method of FIG. 2. The software service 308 may include one or more modules of the analytics application 115 of FIG. 1.

It is understood that there may be other applications that are stored in the memory 304 and are executable by the processor 302 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 304 and are executable by the processor 302. In this respect, the term "executable" means a program file that is in a form that can ultimately be run by the processor 302. Examples of executable programs may be, for example, a compiled program that can be translated into machine code in a format that can be loaded into a random access portion of the memory 304 and run by the processor 302, source code that may be expressed in proper format such as object code that is capable of being loaded into a random access portion of the memory 304 and executed by the processor 302, or source code that may be interpreted by another executable program to generate instructions in a random access portion of the memory 304 to be executed by the processor 302, etc. An executable program may be stored in any portion or component of the memory 304 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 304 is defined herein as including both volatile and nonvolatile memory and data storage components. Volatile components are those that do not retain data values upon loss of power. Nonvolatile components are those that retain data upon a loss of power. Thus, the memory 304 may comprise, for example, random access memory (RANI), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RANI may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 302 may represent multiple processors 302 and/or multiple processor cores and the memory 304 may represent multiple memories 304 that operate in parallel processing circuits, respectively. In such a case, the local interface 306 may be an appropriate network that facilitates communication between any two of the multiple processors 302, between any processor 302 and any of the memories 304, or between any two of the memories 304, etc. The local interface 306 may couple to additional systems such as the communication interface 320 to coordinate communication with remote systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a system such as a software service 308 or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 302 in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor 302 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software service 308, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for pattern detection in service tickets, comprising:
    determining, by an analytics computer application, a service ticket threshold for an Information Technology (IT) resource;
    receiving, by the analytics computer application, a plurality of service tickets for the IT resource;
    pre-processing, by the analytics computer application, text of the plurality of service tickets;
    identifying, by the analytics computer application, keyword patterns in the pre-processed text of the plurality of service tickets;
    grouping, by the analytics computer application, the plurality of service tickets into subsets of service tickets based on the keyword patterns;
    determining, by the analytics computer application, that a number of service tickets in one of the subsets of service tickets exceeds the service ticket threshold;
    identifying, by the analytics computer application, an IT component associated with the subset of service tickets;
    identifying, by the analytics computer application, users affected by the IT component; and
    notifying, by the analytics computer application, the users affected by the IT component of an issue with the IT component.

2. The method of claim 1, wherein the IT resource is a hardware resource or a software resource.

3. The method of claim 1, wherein the service ticket threshold is based on a history of service tickets received for a time period.

4. The method of claim 1, wherein the service ticket threshold is determined periodically.

5. The method of claim 1, wherein the plurality of service tickets are received as a batch.

6. The method of claim 1, wherein the analytics computer application identifies the keyword patterns in the pre-processed text of the plurality of service tickets by searching for specific words related and a number of incidents of the specific words using an encoded query.

7. The method of claim 1, further comprising:
    determining, by the analytics computer application, a status of the IT component.

8. The method of claim 7, wherein the status comprises a Central Processing Unit (CPU) usage and/or a memory load.

9. The method of claim 1, further comprising:
    generating, by the analytics computer application, a report identifying the IT component and a listing of the service tickets in the subset of service tickets.

10. The method of claim 1, further comprising:
    generating, by the analytics computer application, a master service ticket for the subset of service tickets.

11. An electronic device, comprising:
    a memory storing an analytics computer application; and
    a computer processor:
    wherein, when executed by the computer processor, the analytics computer application causes the computer processor to:
        determine a service ticket threshold for an Information Technology (IT) resource;
        receive a plurality of service tickets for the IT resource;
        pre-process text of the plurality of service tickets;
        identify keyword patterns in the pre-processed text of the plurality of service tickets;
        group the plurality of service tickets into subsets of service tickets based on the keyword patterns;
        determine that a number of service tickets in one of the subsets of service tickets exceeds the service ticket threshold;
        identify an IT component associated with the subset of service tickets;
        identify users affected by the IT component; and
        notify the users affected by the IT component of an issue with the IT component.

12. The electronic device of claim 11, wherein the IT resource is a hardware resource or a software resource.

13. The electronic device of claim 11, wherein the service ticket threshold is based on a history of service tickets received for a time period.

14. The electronic device of claim 11, wherein the service ticket threshold is determined periodically.

15. The electronic device of claim 11, wherein the plurality of service tickets are received as a batch.

16. The electronic device of claim 11, wherein the analytics computer application identifies the keyword patterns in the pre-processed text of the plurality of service tickets by searching for specific words related and a number of incidents of the specific words using an encoded query.

17. The electronic device of claim 11, wherein the analytics computer application further causes the computer processor to determine a status of the IT component.

18. The electronic device of claim 17, wherein the status comprises a Central Processing Unit (CPU) usage and/or a memory load.

19. The electronic device of claim 11, f wherein the analytics computer application further causes the computer processor to generate a report identifying the IT component and a listing of the service tickets in the subset.

20. The electronic device of claim 11, wherein the analytics computer application further causes the computer processor to generate a master service ticket for the subset of service tickets.

* * * * *